March 12, 1963 F. J. DINAN 3,081,155
METHOD OF MAKING MAGNESIUM OXIDE
Filed Oct. 9, 1958
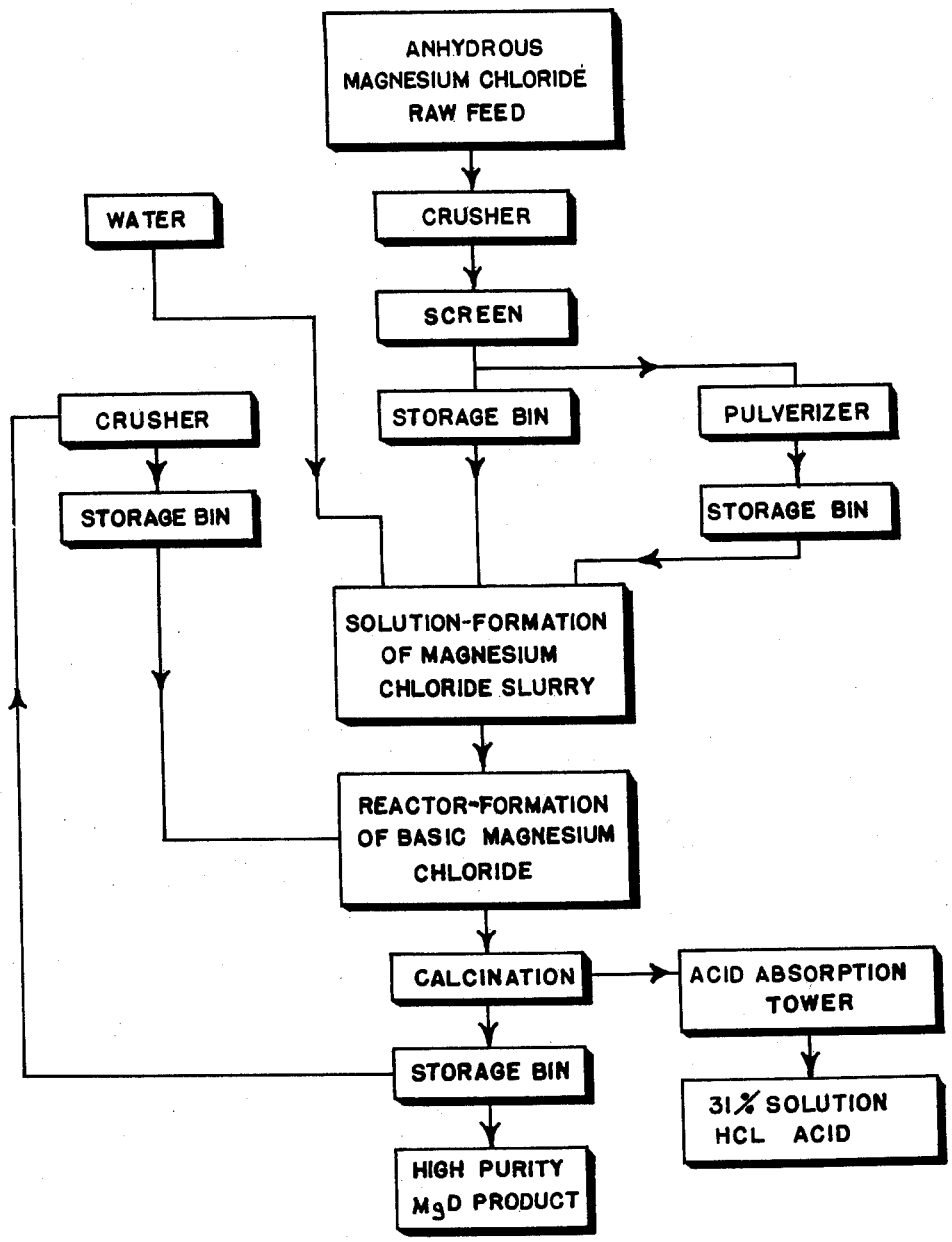
INVENTOR.
FRANK J DINAN
BY
ATTORNEY United States Patent Office 3,081,155
Patented Mar. 12, 1963

3,081,155
METHOD OF MAKING MAGNESIUM OXIDE
Frank J. Dinan, Buffalo, N.Y., assignor to The Carborundum Company, Niagara Falls, N.Y., a corporation of Delaware
Filed Oct. 9, 1958, Ser. No. 766,283
7 Claims. (Cl. 23—201)

This invention relates to a method of making high-purity magnesium oxide. More especially, the invention pertains to an economical method of treating waste by-product anhydrous magnesium chloride or other magnesium chloride waste material to obtain high-purity magnesium oxide and also recover hydrochloric acid in useful concentrations.

The Kroll process of making zirconium metal by the reduction of zirconium tetrachloride with magnesium metal results in the production of about two pounds of anhydrous magnesium chloride ($MgCl_2$) for each pound of zirconium metal produced. Similarly, the production of titanium metal by the reduction of titanium chlorides with magnesium results in the production of substantial quantities of by-product anhydrous magnesium chloride. Anhydrous magnesium chloride is a mica-like crystalline material which dissolves rapidly in water, producing a large amount of heat, and it is strongly hygroscopic. The marked increase in the production of zirconium and titanium metals has presented a real problem in the satisfactory disposal of this by-product anhydrous magnesium chloride. Storage of the material also becomes a serious problem because the material hydrates as it becomes wet and the hydrated material is highly corrosive and quickly attacks metal containers.

Therefore, much thought has been directed toward finding some useful and remunerative means for the disposal of this material, such as using it for the production of magnesium oxide and, possibly, hydrochloric acid. For example, one method was developed in the laboratory by which magnesium oxide was produced by reacting a solution of magnesium chloride with a solution of sodium carbonate and calcining the precipitated magnesium carbonate to form the oxide. This method proved to be so expensive that the resulting product was not even competitive with the most highly priced magnesium oxides on the market. Also, hydrolysis of the anhydrous material in steam to yield magnesium oxide and hydrochloric acid has been attempted and, in agreement with the thermodynamic data involved, proved inoperable except at inordinately high temperatures. Consequently, a need has existed for a feasible process by which such magnesium chloride by-products could be efficiently utilized or converted to useful products at an economic level.

It is therefore an object of the present invention to provide a process for converting waste magnesium chloride by-products of little or no market value such as waste anhydrous magnesium chloride to highly useful products, namely, magnesium oxide of high purity and hydrochloric acid of sufficient strength to be useful without further concentration.

It is another object of the invention to provide a low-cost method of making magnesium oxide of high purity.

Other objects or advantages accruing from the present invention will become apparent as the description herein proceeds.

I have discovered that anhydrous magnesium chloride such as that obtained as a by-product in the magnesium reduction method of making zirconium and titanium metals, can be converted to an infusible basic magnesium chloride which can be decomposed rapidly and completely when heated to 900–1000° C. to form a high-purity magnesium oxide and hydrochloric acid of useful concentration.

The sole FIGURE of the drawing presents a flow sheet showing the various steps of the process of the present invention whereby anhydrous magnesium chloride is converted to an infusible basic magnesium chloride and the latter calcined to produce a magnesium oxide product of high purity and hydrochloric acid.

According to the present invention, anhydrous magnesium chloride is converted to an infusible basic magnesium chloride as follows:

A quantity of anhydrous magnesium chloride is dissolved in water to produce an aqueous solution of specific gravity of about 1.30 to 1.31 at ambient temperature. This corresponds to a saturated solution. A further quantity of the solid anhydrous magnesium chloride is pulverized to a finely divided condition. A quantity of magnesium oxide, such as the magnesium oxide obtained from a previous operation, is screened to pass a 30 mesh screen (U.S. standard sieve series). Although a 30 mesh and finer particle size is herein specified for the magnesium oxide, the particle size of the magnesium oxide is not extremely critical and can be finer or coarser as may be desired.

To 15.4 liters of the saturated solution of magnesium chloride is added 4.25 kilograms of the finely divided magnesium chloride. This is mixed with good agitation and produces a thick liquid slurry. 2.58 kilograms of the magnesium oxide is then slowly added with continued vigorous agitation. During this addition the temperature increases to about 85–90° C. Within 30 minutes after all the magnesium oxide has been added, the mixture starts to set up, although this setting-up time can be varied greatly by changing the composition of the mix very slightly. The setting time is lengthened by decreasing slightly the amount of pulverized magnesium chloride, or shortened by increasing the amount of finely divided magnesium chloride.

After mixing, the slurry is poured into molds and allowed to set up and harden to a solidified condition. The composition of the basic magnesium chloride thus produced corresponds to a material of the following molecular proportions:

| | Mols |
|---|---|
| $MgCl_2$ | 1.7 |
| $MgO$ | 1 |
| $H_2O$ | 12 |

The material has the following composition in parts by weight:

| | |
|---|---|
| $MgCl_2$ | 162 |
| $MgO$ | 40.3 |
| $H_2O$ | 216.0 |

Instead of starting with anhydrous magnesium chloride and dissolving it in water to form a saturated magnesium chloride solution and adding pulverized anhydrous magnesium chloride and magnesium oxide to form the basic magnesium chloride material of the above molar composition, the basic magnesium chloride material of the same molar composition can be prepared by concentrating a waste aqueous magnesium chloride solution to a composition of $1.7MgCl_2:12H_2O$ molar ratio and mixing the resulting material with 1 mol of finely divided MgO. Also, an aqueous solution of magnesium chloride by conventional methods of crystallization can be used to obtain crystalline $MgCl_2 \cdot 6H_2O$, and the latter compound mixed with water and finely divided MgO to produce the desired basic magnesium chloride material for calcination.

The basic magnesium chloride material, whether prepared from anhydrous magnesium chloride as described above or prepared from waste magnesium chloride solutions with the addition of finely divided MgO, is placed in a closed calcining chamber and heated to a temperature of 900–1000° C. for sufficient time to decompose the material, say for about 2 hours. The basic magnesium chloride is decomposed without melting, evolving hydrogen chloride, steam, and some chlorine, the magnesium oxide remaining in the calcining chamber.

An average chemical analysis of the resulting magnesium oxide produced by the above method shows the presence of impurities to the following extent:

| Element | $Cl_2$ | Al | Fe | Cr | Mn | Ni | Pb | Ti | V | Cu | B |
|---|---|---|---|---|---|---|---|---|---|---|---|
| Analysis in p.p.m. based on magnesium | <20 | <20 | <40 | <16 | <16 | <16 | <16 | <16 | <16 | <16 | N.D.[1] |

[1] N.D.=not detected (less than 0.1 p.p.m.)

The resulting magnesium oxide is a product of high purity consisting of substantially above 99% MgO, and is a crystalline material having an average particle size of less than 10 microns.

It has been calculated on the basis of actual operations that the breakdown of the material resulting from the calcining operation is proportionally as follows:

MgO _____ 108.3
HCl _____ 124.0
$H_2O$ _____ 186.0

It is readily apparent from the above breakdown of the material that the hydrochloric acid-steam mixture discharging from the calciner contains 40% HCl. Therefore, collection of the hydrogen chloride and water from the calciner into a water tower can be carried out to yield 31% hydrochloric acid, which is the standard composition on the market today.

It is not desired to restrict the carrying out of the present process to the use of any specific type of equipment. The calcining operation, for example, has been carried out in a stationary horizontal silica tube, electrically heated, as a continuous operation for many weeks. However, the process can be carried out in a refractory-lined rotary kiln or in a vertical shaft kiln.

When the anhydrous magnesium chloride used in the present process is derived as a waste product from the production of zirconium metal, it may be found in any size ranging from fine powder up to 12-inch chunks, and usually contains some quantity of magnesium metal. The coarse anhydrous magnesium chloride can be used as is, to make a solution, in which case the magnesium metal is separated by allowing it to settle in the bottom of the dissolving tank. However, material of this type is preferably reduced to ½-inch size in a crusher and screened to remove most of the magnesium metal, after which approximately 40% of the material should be reduced to finely divided or powdered condition, such as by passing through a micro-pulverizer. The remainder of the material is dissolved in water to produce a saturated solution (32–34% $MgCl_2$) and filtered to remove magnesium metal, or the magnesium metal allowed to settle for separation. In carrying out the process as a continuous operation the slurry consisting of the saturated solution of magnesium chloride containing the added finely divided solid magnesium chloride can be fed continuously with magnesium oxide in the desired proportion into a long ribbon mixer or rotating tube in which it gradually solidifies and is discharged as a granular material. The resulting granules of solid basic magnesium chloride are then passed into a calciner through a gas-tight feeding mechanism. The evolved hydrogen chloride and steam are discharged from the calciner into an absorption tower and collected as hydrochloric acid of high concentration. The residual high-purity magnesium oxide is periodically removed from the calciner.

Having described the invention, it is desired to claim:

1. A method of making high purity magnesium oxide from magnesium chloride which comprises forming a slurry of particulate magnesium chloride in a saturated aqueous solution of magnesium chloride, mixing particulate magnesium oxide with said slurry to form a settable mixture, allowing said mixture to set to form a solidified, hardened, infusible mass of basic magnesium chloride, calcining said mass in a closed chamber and while excluding extraneous gases to a temperature of about 900° C.–1000° C., whereby to decompose said mass to form magnesium oxide, hydrogen chloride and steam, and continuously withdrawing the evolved hydrogen chloride and steam, as evolved, to leave, upon completion of the calcining, a solid residue of high purity magnesium oxide.

2. A method as set forth in claim 1 in which the hydrogen chloride and steam are passed into and collected in a water tower to yield directly a solution of hydrochloric acid of high commercial concentration.

3. A method as set forth in claim 2 in which the hydrochloric acid is approximately 31% in concentration.

4. A method as set forth in claim 1 in which the solidified hardened mass contains MgO, $MgCl_2$ and $H_2O$ in a molar ratio of approximately 1.7:1:12, respectively.

5. A method of making high purity magnesium oxide which comprises forming a mass of infusible, basic magnesium chloride containing MgO, $MgCl_2$ and $H_2O$ in a molar ratio of approximately 1.7:1:12, respectively, calcining said mass in a closed chamber and while excluding extraneous gases to a temperature of about 900° C.–1000° C., whereby to decompose said mass to form magnesium oxide, hydrogen chloride and steam, and continuously withdrawing the evolved hydrogen chloride and steam to leave, upon completion of the calcining, a solid residue of high purity magnesium oxide.

6. A method as set forth in claim 5 in which the hydrogen chloride and steam are passed into and collected in a water tower to yield directly a solution of hydrochloric acid of high commercial concentration.

7. A method as set forth in claim 6 in which the hydrochloric acid is approximately 31% in concentration.

References Cited in the file of this patent

UNITED STATES PATENTS 2,413,292   Christensen _____ Dec. 31, 1946

OTHER REFERENCES

Chemical Engineering, August 1956, pages 142 and 346.